United States Patent
Huijzen et al.

(10) Patent No.: US 11,413,853 B2
(45) Date of Patent: Aug. 16, 2022

(54) SELF-SEALING FUEL TANK

(71) Applicant: Pluscom Security Solutions Inc., Bloomfield, NJ (US)

(72) Inventors: Ronald Dick Huijzen, Barendrecht (NL); Jakob Sikkes Havinga, Rijswijk (NL); Johannes Hubertus Naus, Rijswijk (NL); Gözde Tuzcu, Rijswijk (NL)

(73) Assignee: Pluscom Security Solutions Inc., Bloomfield, NJ (US)

(*) Notice: Subject to any disclaimer, the term of this patent is extended or adjusted under 35 U.S.C. 154(b) by 351 days.

(21) Appl. No.: 16/745,866

(22) Filed: Jan. 17, 2020

(65) Prior Publication Data
US 2021/0221221 A1   Jul. 22, 2021

(51) Int. Cl.
| | | |
|---|---|---|
| *B32B 1/02* | (2006.01) | |
| *B32B 27/06* | (2006.01) | |
| *B60K 15/03* | (2006.01) | |
| *B32B 25/04* | (2006.01) | |
| *B32B 5/24* | (2006.01) | |
| *B32B 27/20* | (2006.01) | |
| *B32B 5/02* | (2006.01) | |
| *B32B 27/32* | (2006.01) | |
| *B32B 27/40* | (2006.01) | |
| *B32B 1/00* | (2006.01) | |

(52) U.S. Cl.
CPC ............ *B32B 25/045* (2013.01); *B32B 1/02* (2013.01); *B32B 5/245* (2013.01); *B32B 27/065* (2013.01); *B32B 27/20* (2013.01); *B60K 15/03177* (2013.01); *B32B 1/00* (2013.01); *B32B 5/02* (2013.01); *B32B 27/32* (2013.01); *B32B 27/40* (2013.01); *B32B 2255/102* (2013.01); *B32B 2266/0207* (2013.01); *B32B 2266/0278* (2013.01); *B32B 2439/40* (2013.01); *B60K 2015/03046* (2013.01); *B60K 2015/03381* (2013.01); *B60K 2015/03407* (2013.01); *B60K 2015/03447* (2013.01); *B60K 2015/03493* (2013.01)

(58) Field of Classification Search
CPC .. B32B 1/00; B32B 1/02; B32B 5/245; B32B 25/045; B32B 27/065; B32B 27/20; B32B 27/205; B32B 27/24; B32B 27/32; B32B 27/327; B32B 27/40; B32B 2255/102; B32B 2266/0207; B32B 2439/40; B60K 15/03; B60K 15/03177; B60K 2015/03032; B60K 2015/03046; B60K 2015/03447
See application file for complete search history.

(56) References Cited

U.S. PATENT DOCUMENTS

| | | | |
|---|---|---|---|
| 3,698,587 A * | 10/1972 | Baker | B60K 15/03177 220/900 |
| 6,518,348 B1 | 2/2003 | Lee et al. | |
| 2007/0197686 A1* | 8/2007 | Dimanshteyn | C09D 5/18 523/179 |
| 2008/0234411 A1* | 9/2008 | Bobsein | C08G 18/0814 524/48 |
| 2008/0264951 A1* | 10/2008 | Tweet | B64D 37/06 220/560.02 |
| 2011/0097954 A1* | 4/2011 | Bone | B32B 5/24 156/331.7 |

FOREIGN PATENT DOCUMENTS

GB    2015952 A    9/1979

OTHER PUBLICATIONS

Jul. 1, 2020 (EP) Extended European Search Report Application No. 20152416.2.

* cited by examiner

*Primary Examiner* — Walter Aughenbaugh
(74) *Attorney, Agent, or Firm* — Banner & Witcoff, Ltd.

(57) ABSTRACT

A fuel container having walls defining a space in which fuel is to be contained, a layer of deformable material bonded to the external surfaces of the container walls, and a self-sealing layer of fuel-activated swellable material bonded to the deformable material, wherein said self-sealing layer is a latex foam, in particular a natural rubber latex foam, comprising a non-ionic associative thickener as rheology modifier and optionally other additives such as foam enhancers, foam stabilizers, accelerators and vulcanization components.

12 Claims, No Drawings

SELF-SEALING FUEL TANK

This invention relates to fuel containers, and is more particularly concerned with fuel tanks provided with a coating that provides protection against leakage and explosion on impact.

Fuel tanks for use in transportation such as road transport vehicles and aviation have generally been manufactured from metal (steel, aluminum) or plastic (e.g. HDPE). There is a danger with these fuel tanks, whether they are constructed from metallic or non-metallic materials, that if they are punctured by a high velocity object such as a bullet or a missile there may be an explosion, or leakage of fuel with a danger of fire and subsequent explosion.

It is known to make fuel tanks self-sealing in the event of these being punctured. This self-sealing capacity is provided by a fuel-activated swellable material incorporated as one of the layers making up the fuel tank. Should the tank be ruptured this material reacts upon contact with the leaking fuel, and swells up so as to seal the hole or wound. The self-sealing foam (SSF) is usually a type of elastic foam such as rubber with an open or partly open cell structure which swells by absorbing the fuel leaking through the punctured area.

The current self-sealing tank technology generally has several layers: a bottom layer of compact closed-celled rubber, two or more layers self-sealing foam, a fabric and a polyurethane top layer.

Current sealing systems function properly, however the production technique is labor intensive. The first three layers are cut and glued manually, only the top layer is applied by spraying.

U.S. Pat. No. 8,779,016 describes a spray latex foam for filling wall cavities to enhance sealing and insulation properties of a building. The latex suitable for use in the spray foam is preferably polyvinylidene chloride or styrene-butadiene rubber, which are swellable latexes but they swell too slowly or not sufficient to be useable in the present invention. The latex system also includes a thixotropic agent such as LAPONITE RD synthetic clay and a gaseous coagulating component.

An objective of the present invention is to provide an alternative self-sealing layer for fuel tanks that can be applied more easily and faster than the current self-sealing foams without compromising the quality reached by the former self-sealing foams and application technique.

It is a further objective of the present invention to provide a fuel container covered/protected with such a self-sealing layer.

According to one aspect of the present invention a self-sealing layer of fuel-activated swellable material for fuel containers is provided, wherein said self-sealing layer is a latex foam, in particular a natural rubber (NR) latex foam, comprising a non-ionic associative thickener as rheology modifier and optionally other additives such as foam stabilizers, emulsifiers, coagulators and vulcanization components.

The rheology modifier (thickener) to be used in the present invention in order to obtain the desired degree of viscosity needed for the proper formulation and application of the foam formulation is a non-ionic associative thickener (NIAT), including HEAT types (melamine/aminoplast linkages) and preferably HEUR types (urethane linkages). Most preferably a hydrophobically modified ethylene oxide urethane (HEUR) is used wherein the hydrophobic moiety contains amine functionality. The use of such a rheology modifier optimizes both sag resistance, leveling of the foam surface and flow of the latex foam formulation across a range of shear.

Further said rheology modifiers don't interfere/inhibit the foaming process and the stability of the foam (no destruction of the foam structure) and do not interfere with the vulcanization process of the latex foam. These two processes, foaming and vulcanization are vital for the functionality of the self-sealing layer of the present invention. Further the latex foam is sensitive to pH change and the integration of the rheology modifier (gelling/hydrodynamic thickening/network forming). As the rheology modifier integrates it must not effect the stability of the latex dispersion because otherwise the foam can coagulate and lose its liquid (flow) behaviour. The non-associative thickener for use in the present invention, in particular HEUR types increase the viscosity while keeping the foam structure flowy which is essential for the present invention. The non-ionic nature of the rheology modifier for use in the present invention maintains the foam and colloidal stability while increasing its viscosity; this is not happening with ionic rheology modifiers.

By adjusting the ratios between the various components in the latex foam a uniform open cell or partly open cell structure is established needed to obtain appropriate swelling properties.

Associative thickeners are so called because the mechanism by which they thicken is believed to involve hydrophobic associations between the hydrophobic moieties in the thickener molecules and/or between the hydrophobic moieties in the thickener molecules and other hydrophobic surfaces.

One type of commonly used associative thickener has a polymeric backbone constructed from one or more blocks of polymerized oxyalkylene units, typically polyethylene oxide or polypropylene oxide, with hydrophobic groups attached to or within the backbone. Another type of commonly used associative thickener utilizes a cellulosic backbone with hydrophobic groups attached to the backbone. Both of these types of associative thickeners can be characterized as non-ionic polyether thickeners as they both have backbones comprising ether linkages. In addition to polyether segments, other types of segments can be incorporated into the backbone of a polyether associative thickener. Associative thickeners with polyurethane polyether backbone segments and containing hydrophobic groups comprising tertiary and secondary amine functionalities have also been disclosed.

A polyether associative thickener is based on building blocks of polyoxyalkylene segments, for example, polyethylene glycol building blocks. For example, the associative thickener may have a backbone comprising one or more polyoxyalkylene segments greater than 10 oxyalkylene units in length. As used herein the term "oxyalkylene" refers to units having the structure —(O-A)- wherein O-A represents the monomeric residue of the polymerization reaction product of a C2-C8 alkylene oxide. Examples of oxyalkylene include but are not limited to oxyethylene, oxypropylene, oxytrimethylene, oxybutylene. Polymers containing these units are referred to as "polyoxyalkylenes". The polyoxyalkylene units can be homopolymeric or copolymeric. Examples of homopolymers of polyxoyalkylenes include but are not limited to polyoxyethylene, polyoxypropylene, polyoxytrimethylene, polyoxybutylene. Examples of polyoxybutylene include a homopolymer containing units of 1,2-oxybutylene, and polytetrahydrofuran, a homopolymer containing units of 1,4-oxybutylene. Alternatively, the polyxoyalkylene segments can be copolymeric, containing two or more different oxyalkylene units. The different oxyalkylene units can be arranged randomly to form a random polyoxyalkylene or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment.

Polyoxyalkylene segments can also be linked with non-polyoxyalkylene segments or linkages.

When the polyoxyalkylene units are linked with a multi-functional isocyanate, a hydrophobically modified polyurethane polyether associative thickener is generated as is known in the art (HEUR). These thickeners can also contain urea linkages, ester linkages or ether linkages other than those linking the polyoxyalkylene units. The multi-functional isocyanates can be aliphatic, cycloaliphatic, or aromatic and can be used singly or in admixture of two or more, including mixtures of isomers. Examples of suitable organic polyisocyanates include 1,4-tetramethylene diisocyanate, 1,6-hexamethylene diisocyanate, 2,2,4-trimethyl-1,6-diisocyanato-hexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenyl-methane-4,4',4"-triisocyanate.

When the polyoxyalkylene segments are linked with a gem-dihalide reagent, hydrophobically modified polyacetal polyether and polyketal polyether associative thickeners are generated. Suitable gem-dihalide reagents include dihalogenomethanes, such as dibromomethane and dichloromethane, 1,1-dichlorotoluene, 1,1-dichloroethane, and 1,1-dibromomethane.

When the polyoxyalkylene units are linked with an aminoplast reagent, a hydrophobically modified aminoplast polyether associative thickener is generated (HEAT). When polyoxyalkylene units are linked with an epihalohydrin or trihaloalkene reagent, a hydrophobically modified polyEPI polyether associative thickener is generated, where EPI represent the residue of an epihalohydrin reagent's or a trihaloalkane reagent's reaction with amines, alcohols or mercaptans.

Thus, the associative thickener may have a backbone comprising one or more polyoxyalkylene segments greater than 10 oxyalkylene units in length and one or more segments, selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

Preferably the rheology modifier for use in the present invention is a hydrophobically modified polyurethane polyether associative thickener also known in the art as HEUR. A general description of HEUR rheology modifiers can be found in "Next generation Rheology Modifier Technology" by John J. Rabasco, Tara Lyn Conley, David Fasano and Daniel Saucy, Coatingstech, March 2014, page 58-66.

HEUR rheology modifiers consist of a water-soluble polymer backbone that contains two or more hydrophobic groups and can be depicted by the general structure shown below.

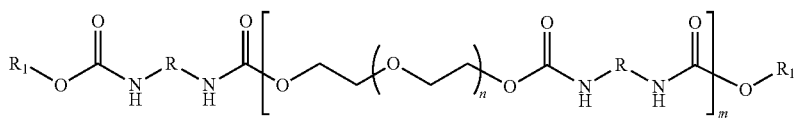

Particularly preferred is the use of HEUR hydrophobic moieties that contain amine functionality. Such compounds are described in U.S. Pat. No. 7,741,402, incorporated herein by reference. According to a preferred embodiment at least one of the hydrophobic groups attached to or within the thickener backbone contains a secondary amine, or a tertiary amine, or a tertiary phosphine or a combination thereof, and optionally a quaternary amine. Such compounds are commercially available from Dow under the tradename ACRYSOL RM-12W, supplied in the form of an aqueous emulsion with 19% solids, from Arkema under the tradename Coapur™XS, from Hankuck Latices under the tradename HIRESOL and from BYK under the tradename RHEOBYK.

The present rheology modifier is generally used in the self-sealing foam formulation in an amount of up to 15% by weight, preferably between 0.1 and 10% by weight based on the total foam, more preferably between 1 and 5% by weight.

The latex foam to be used as the self-sealing layer of the present invention includes a latex system. Preferably, the latex system is an aqueous latex emulsion. The latex emulsion includes latex particles that are typically produced by emulsion polymerization. In addition to the latex particles, the latex emulsion may include water, a stabilizer, a surfactant and optionally other additives.

There are numerous types of latex that may be used in the latex emulsion of the present invention as long as the latex has the property of swelling when exposed to fuel. Non-limiting examples of suitable latexes include natural and synthetic rubber resins, and mixtures thereof, including thermosettable rubbers; thermoplastic rubbers and elastomers including, for example, natural rubber; polyisoprene rubbers; polychloroprene rubbers; polybutadiene rubbers; butyl rubbers; ethylene-propylene-diene monomer rubbers (EPDM); ethylene-propylene rubbers; styrene-butadiene copolymers; styrene-isoprene copolymers; styrene-butadiene-styrene rubbers; styrene-isoprene-styrene rubbers; styrene-ethylene-butylene-styrene rubbers; styrene-ethylene-propylene-styrene rubbers; polyisobutylene rubbers; ethylene vinyl acetate rubbers; silicone rubbers including, for example, polysiloxanes; methacrylate rubbers; polyacrylate rubbers including, for example, copolymers of isooctyl acrylate and acrylic acid; polyesters; polyether esters; polyvinyl chloride; polyvinylidene chloride; polyvinyl ethers;

polyurethanes and blends; and combinations thereof, including, for example, linear, radial, star and tapered block copolymers thereof. Preferably the latex to be used in the self-sealing foam of the present invention should swell at least by 80% when exposed to fuel. In addition to swelling and firmness the swollen latex should maintain its adhesion to the adjacent layers to avoid wrinkling. The latex for use in this invention includes natural rubber (NR) and polyisoprene rubber but preferably natural rubber is used generally being easier to process and having more strength.

Any reactive latex solids content may be employed in the latex emulsion. The reactive latex solids content of the emulsion may be greater than about 30% by weight, preferably greater than about 40% by weight and more preferably greater than about 50% by weight, based on the total weight of the emulsion. Additionally, the reactive latex solids content of the emulsion may be less than about 80% by weight, preferably less than about 70% by weight, and more preferably less than about 60% by weight, based on the total weight of the emulsion.

It is preferred that the latex employed in the latex emulsion be stabilized. In order to achieve an acceptable stability, the latex emulsion may include a stabilizer. It is desirable that the stabilizer create a basic environment for the latex. Ammonia is a preferred stabilizer. Preferably, a basic ammonia solution having a pH between about 8 and about 12, preferably about 10, is used. Other caustic material that can be used to stabilize the latex emulsion include, for example, potassium hydroxide and sodium hydroxide.

Additionally, the latex emulsion may include a surfactant.

The preferred NR latex to be used according to the present invention is a high molecular weight polymer dispersed and stabilized with ammonia in water having a solid content of about 60%.

The latex emulsion is generally present in an amount from about 60 to about 95% by weight of the latex foam formulation. Preferably the latex emulsion is present in an amount from about 70 to about 93% by weight of the latex foam formulation.

In addition to the rheology modifier described above, the latex foam may include further thixotropic agents.

The latex foam may also include other optional additional components such as, for example, foam promotors, colorants, accelerators, foam stabilizers and/or blowing agents. Soaps, such as oleates, used in the formulation help to improve the colloidal stability and higher amounts thereof will be beneficial for applications that require higher speed. It is to be appreciated that a material will often serve more than one of the aforementioned functions, as may be evident to one skilled in the art, even though the material may be primarily discussed only under one functional heading herein.

Optionally, one or more foam promotors may be included in the latex foam. The foam promotor aids in forming a stable foam cell structure. The foam promotors may be selected from quaternary ammonium soaps and betaines, amines and proteins, carboxylate soaps such as oleates, ricinoleates, castor oil soaps and rosinates, and combinations thereof. The preferred foam promotor is a carboxylate soap. A preferred carboxylate soap is potassium oleate. The foam promotor may be used in an amount of up to about 3% by weight of the latex foam, preferably from about 0.5 to about 2.5% by weight of the latex foam.

One or more colorants may be used in the latex foam. Colorants that may be used in the latex foam include, but are not limited to, carbon, iron oxide, and graphite. The colorant may be present in the latex foam in an amount up to about 10% by weight, preferably from about 1 to about 4% by weight of the latex foam.

Optionally one or more accelerators may also be present in the latex foam of the present invention. The presence of an accelerator aids in the coagulation process. Coagulation refers to the phenomena of latex particles coming together and the polymer chains interlocking with each other. Non-limiting examples of accelerators useful in the present invention include thiozole compounds such as zinc mercaptobenzythiazolate (ZMBT), polyfunctional oxime compounds such as p,p'-dibenzoylquinone dioxime, and dithiocarbamates such as zinc dimethyl dithiocarbamate (ZDEC) and sodium dibutyl dithiocarbamate, and diphenylguanidine (DPG). If used, the accelerator may be included in the latex foam in an amount up to about 10% by weight, preferably from about 1.5 to about 8% by weight.

Further, one or more foam stabilizers may be present in the latex foam. Foam stabilizers tend to enhance the integrity of the foam in the shaping and setting process and may also act as foaming aids. Non-limiting examples of foam stabilizers include, for example, zinc oxide and magnesium oxide and ammonium chloride. It has been observed that the use of low pH stabilizers such as sodium silicofluoride or $CO_2$ leads to coagulation within less than 5 minutes after adding the stabilizers due to the drastic drop of the pH below 9. Therefore $NH_4Cl$ is the preferred foam stabilizer because it induces only a slight change in pH and therefore does not lead to immediate coagulation. If used, the foam stabilizer may be included in an amount up to about 10% by weight, depending on the type of foam stabilizer used, and preferably between about 0.5 and about 6% by weight of the latex foam. The preferred amount of foam stabilizer is that which allows the foam stabilizer to become soluble in the serum as the pH becomes acidic and to work with fatty acid soaps (i.e., foam promotors) to form a stable cell structure. In order to prevent premature coagulation when the pH gets too low and the foam too acidic the foam stabilizer is generally added towards the end of the foam formulation mixing and the pH is not allowed to fall under 8-8.5.

In the latex foam of the present invention blowing agents are generally not used since for the envisaged application control of thickness is essential.

Coagulation is needed for the mechanical stabilization of the foam preferably immediately after dispensing the foam. The addition of gelling agents or coagulating agents such as sodium silicofluoride (SSF) lowers the pH of the latex and leads to coagulation. Coagulated latex does not have flow properties. Coagulating agents are generally not added to the present latex foam. Coagulation in the present invention generally happens by the evaporation of ammonia (pH drops). By acidification of the aqueous matrix of the latex, the latex particles are caused to drop out of solution and coagulate.

Viscosity of the foam formulation is generally in the range 1000 to 3000 MPa·s.

Vulcanization is needed to fix the foam structure once applied. Vulcanisation is usually effected by heating (generally for 2 hours at 100° C., or 3 hours at 80° C. or 15 hours at 60° C.) the latex generally containing an admixture of sulphur and other vulcanizing ingredients. Suitable vulcanizing ingredients for use in the present latex foam include Sulphur, ZDEC, ZMBT and zinc oxide. Vulcanizing ingredients are generally added in an amount of up to 10% by weight of the latex foam.

A particularly preferred self sealing foam formulation for use in the present invention contains natural rubber, a HEUR rheology modifier, carboxylate soap as foam promotor, ammonium chloride as latex stabilizer and ZnO as a foam stabilizer The latex foam formulation is generally prepared by first mixing of the latex with the components that do not retard foaming or accelerate coagulation of the latex, subsequently foaming and then mixing in the rest of the components (such as foam stabilizers and coagulators). After adding these last components the onset of coagulation process is a couple of minutes. Therefore the dispensing action needs to be finished before coagulation starts.

Optionally the foam structure can be subjected to a drying and curing process after complete coagulation. A curing process generally requires a prolonged heating step to allow the polymer top to vulcanize (cross-link). Drying the present latex foam at a temperature of between 60 and 100° C. is generally sufficient to obtain a firm foam with a stable cell structure.

Mixing of first components and the foaming can be done with a mixing device such as a continuous mixer. One advantage of utilizing a continuous mixer is that it mixes intensively without generating a large amount of heat which can cause the latex to coagulate prematurely. The foam mix is subsequently being transferred into a static mixer where the foam is mixed up with the second components and thereafter dispensed on the surface. Mixing is generally carried out at room temperature (20±3° C.) or within a temperature range of 10 to 30° C., preferably 18 to 25° C.

Foaming is mainly dependent on mixing speed and time. The present latex foam generally has a density varying between 0.05 and 0.8 g/ml, preferably between 0.2 g/ml and 0.4 g/ml.

The latex foam layer can be applied to the surface to be coated by any suitable dispensing technique on rotating bodies such as by pouring or spraying the foam formulation on the surface to be coated. Most preferably the latex foam is applied via spraying at low pressure of max 3 bar The mechanical stability of the formulation is not sufficient for spraying at higher pressures. The mechanical stability could be improved by adding anti-coagulant additives and colloid stabilizers.

A suitable dispensing apparatus contains a container with an option of air pressure or a mechanical pressing unit such as dispensing syringe, an application nozzle suiting with the working pressure which is connected to the container directly or through a flexible hose optionally with a peristaltic pump.

According to another aspect of the present invention a fuel container is provided having walls defining a space in which fuel is to be contained, a layer of deformable material bonded to the external surfaces of the container walls, and a self-sealing layer of fuel-activated swellable material bonded to the deformable material, wherein said self-sealing layer is a latex foam, in particular a natural rubber (NR) latex foam, comprising a rheology modifier and optionally other additives such as foam stabilizers, emulsifiers, coagulators and vulcanization components wherein the rheology modifier is a non-ionic associative thickener (NIAT).

The fuel container of the present invention may be manufactured from any suitable metal such as steel or aluminium. Alternatively, it may be manufactured from a suitable fuel-resistant non-metallic material. In a particular embodiment the fuel container is manufactured as a rotational moulding from a hydrocarbon fuel-resistant high density polyethylene.

To facilitate satisfactory bonding of the deformable material to the external surfaces of a container of such material, these surfaces are preferably flame-treated to obtain chemical modification of the polyethylene before being coated with a suitable fuel-resistant primer such as an isocyanate primer. A polar fabric layer between the polyethylene and the deformable material is preferred as primer. Such a fabric is not dissolved by the fuel and adheres to the deformable material without the need for an adhesive and keeps the deformable material fixed on the surface, preventing corrugation of the deformable material upon swelling. For metal containers the deformable material readily adheres and in general there is no need for a primer then.

After the primer has been dried, the deformable material is then bonded to the external surfaces of the container using a fuel-resistant adhesive, such as an air-curing nitrile-based adhesive, and satisfactory levels of adhesion between the two materials are obtained. In the case of a metallic tank the external surfaces of the walls are usually roughened and cleaned by known grit-blasting techniques before being coated with a suitable primer.

The fuel container is generally provided with a filler pipe, an access cover, a fuel gauge connection opening, and a vent connector.

An inner wall tank lining formed by a layer of fuel-resistant nitrile rubber may be provided.

Preferably, the interior of a fuel container in accordance with the invention is provided with an explosion suppressant, such as a non-metallic or metallic open-pored foam or lattice, or a thermally-bonded non-woven fibrous structured material.

The deformable material may be a rubber or rubber-like material of the closed celled type and may comprise a semi-rigid closed cell foamed plastics material such as a blown polyvinylchloride foam material. Outward petalling of the tank wall material where the object exits from the tank will be absorbed by deformation of this material. A preferred deformable material is Armaflex/Armacell, a closed cell rubber foam which functions as a support layer for the self-sealing foam. Armaflex is a resilient material which bounces back very easily when the foam is punctured with a gunshot. Armaflex has low swelling properties but its high resilience helps the sealing function of the self-sealing foam. The thickness of the deformable material layer is generally between 3 and 9 mm. Another suitable material is Kaiflex.

A primer may be foreseen between the deformable material and the self sealing layer. A preferred primer is a woven textile having polar groups such as polyester based on nylon textiles. Textile adhered to the self-sealing layer works as a skeleton for the foam and keeps it in place and leads to efficient sealing function.

The thickness of the self-sealing layer is generally between 3 and 15 mm.

On top of the self-sealing foam, a fabric layer is usually provided. This fabric layer minimizes the wound damage caused by the object penetrating the self-sealing covering. Further it also functions as a protection layer to the self-sealing foam layer before the application of the top layer. Examples of such a fabric is Dyneema which is a PE fiber woven to a fabric and commercially available from DSM. The fabric may comprise woven or knitted nylon (e.g. Kevlar) or high strength aromatic polyamide fibers. The thickness of this fabric layer is usually 1 to 2 mm.

The top layer is usually based on polyurethane. This outermost layer holds all the layers intact and in shape and protects against the environmental conditions and is generally 3 to 6 mm thick. Preferably said polyurethane top layer also has flame-retardant capabilities. The polyurethane top layer might react with the components in the rubber foam and give a damage to the sealing structure and therefore the fabric protection layer is in some cases also required. This polyurethane layer may be made by reacting an organic polyisocyanate with a reactive hydrogen-containing material having a molecular weight of about 700 to about 4000 and then curing the reaction product with a crosslinker. The polyurethane layer is generally cast in place on the outside of the fabric layer by use of a mold surrounding the tank wall or alternatively, it can be sprayed thereon with a suitable spray gun.

The invention is further illustrated by, but to not limited to, the following examples.

EXAMPLES

The ingredients as listed in Table 1 below were used in these examples.

TABLE 1

Components used for the NR foam formulation

| Component | Function | Form | Solid content | pH | Supplier |
|---|---|---|---|---|---|
| NR latex | Rubber | Emulsion LATS | 60% | 9 | RCMA |
| K-oleate | Foam promotor (FP) | Solution | 17.5% | 11.5 | Aquaspersions |
| Laponite RD | Rheology modifier (RM) | Powder | | 9.5 (solution) | BYK |
| ACRYSOL ASE-60 ER | Anionic RM (ASE type) | Aqueous emulsion | 28% | 2.5 | Dow |
| ACRYSOL TT-615 | Anionic RM (HASE type) | Aqueous emulsion | 30% | 2.3 | Dow |
| ACRYSOL RM-12W | RM | Aqueous emulsion | 19% | 5.5 | Dow |
| ZDEC | Accelerator | Aquous dispersion | 52% | 9.7 | Akron Chemicals |
| ZMBT | Accelerator | Aqueous dispersion | 52% | 9.7 | Akron Chemicals |
| Sulphur | Vulcanization agent | Aqueous dispersion | 68% | 9.5 | Akron Chemicals |
| ZnO | Vulcanization agent + Foam Stabilizer | Aqueous dispersion | 66% | 9.7 | Akron Chemicals |
| DPG (diphenyl guanidine) | Accelerator + foam stabilizer | Aqueous dispersion | 40% | 10.0 | Aquaspersions |
| SSF (sodium silicofluoride) | Foam stabilizer | Aqueous dispersion | 50% | 4.6 | Aquaspersions |
| $NH_4Cl$ | Foam stabilizer | Powder | 20% (solution) | 5.8 (solution) | Bik & Bik Drogisterij |

Example 1: Foam Formulation Recipes with Various Thickeners

Latex foam formulations were prepared from the ingredients listed in Table 2 below. Various rheology modifiers were tested.

Laponite RD is found to be not homogeneously mixed into the latex. As a result there is no significant viscosity increase in the latex, and formation of local coagulations or non-dispersed solid material is observed during mixing. Other thixotropic agents tested were three Dow products: TT615, ASE 60 ER and RM-12W. These three rheology modifiers, each with a different thickening mechanism were selected and added in the trial recipes. The ASE type rheology modifier works through a water absorption/volume exclusion (ionic) thickening mechanism. The HASE type rheology modifier works through volume exclusion (ionic) and associative thickening (non ionic). The HEUR type rheology modifier works solely through non-ionic associative thickening. Table 2 shows the examples of the recipes with different rheology modifiers added.

TABLE 2

Testing of various rheology modifiers

| Recipe | Ingredients | Function | Pbw | Tmix (min)/ vmix (Hz) | Observations |
|---|---|---|---|---|---|
| 6 | NR latex (60%) | Rubber | 100 | 5/1 | Volume increase up to 175% |
| | Accelerator 1 | Vulcanization system (accelerators, vulcanization agents and sulfur) | 1 | | |
| | Accelerator 2 | | 0.75 | | |
| | Sulphur (60%) | | 1.75 | | |
| | | Foam enhancer | 1 | 3/1 | Volume increase up to 200% |
| | Laponite RD (10% exfoliated in water) | Rheology modifier | 1 | 1/2 + 1/4 + 1/8 | Local coagulations |
| | | Foam stabilizer 1 | 1.5 | 2/2 | Local Coagulations, low viscosity |
| | | Foam stabilizer 2 + accelerator | 0.5 | 1/2 | |
| | | Foam stabilizer 3 | 0.5 | 1/2 | |
| 7 | NR latex (60%) | rubber | 100 | 5/1 | Volume increase up to 175% |
| | accelerator 1 | Vulcanization | 1 | | |

TABLE 2-continued

Testing of various rheology modifiers

| Recipe | Ingredients | Function | Pbw | Tmix (min)/ vmix (Hz) | Observations |
|---|---|---|---|---|---|
| | accelerator 2 | system | 0.75 | | |
| | Sulphur (60%) | (accelerators, vulcanization agents and sulfur) | 1.75 | | |
| | | Foam enhancer | 1 | 3/1 | Volume increase up to 200% |
| | TT615 | Rheology Modifier | 1 | 1/2 + 1/4 + 1/8 | coagulation |
| | | Foam stabilizer 1 | 1.5 | 3/2 | coagulation |
| | | Foam stabilizer 2 + accelerator | 0.5 | | |
| | | Foam stabilizer 3 | 0.5 | | |
| 8 | NR latex (60%) | Rubber | 100 | 5/1 | Volume increase up to 175% |
| | accelerator 1 | Vulcanization | 1 | | |
| | accelerator 2 | system | 0.75 | | |
| | Sulphur (60%) | (accelerators, vulcanization agents and sulfur) | 1.75 | | |
| | | Foam enhancer | 1 | 3/1 | Volume increase up to 200% |
| | ASE 60 ER | Rheology Modifier | 1 | 1/2 + 1/4 + 1/8 | Focal coagulations |
| | | Foam stabilizer 1 | 1.5 | 2/2 | Coagulation |
| | | Foam stabilizer 2 + accelerator | 0.5 | 1/2 | |
| | | Foam stabilizer 3 | 0.5 | 1/2 | |
| 9 | NR latex (60%) | Rubber | 100 | 5/1 | Volume increase up to 175% |
| | accelerator 1 | Vulcanization | 1 | | |
| | accelerator 2 | system | 0.75 | | |
| | Sulphur (60%) | (accelerators, vulcanization agents and sulfur) | 1.75 | | |
| | | Foam enhancer | 1 | 3/1 | Volume increase up to 200% |
| | RM-12W | Rheology Modifier | 1 | 1/2 + 1/4 + 1/8 | No coagulation, viscosity increased |
| | | Foam stabilizer 1 | 1.5 | 2/2 | No coagulation, high viscosity |
| | | Foam stabilizer 1 + accelerator | 0.5 | 1/2 | |
| | | Foam stabilizer 2 | 0.5 | 1/2 | |
| 10 | NR latex (60%) | Rubber | 100 | 5/1 | Volume increase up to 175% |
| | accelerator 1 | Vulcanization | 1 | | |
| | accelerator 2 | system | 0.75 | | |
| | Sulphur (60%) | (accelerators, vulcanization agents and sulfur) | 1.75 | | |
| | | Foam enhancer | 1 | 3/1 | Volume increase up to 200% |
| | RM-12W | Rheology Modifier | 1 | 1/2 + 1/4 + 1/8 | No coagulation, viscosity increased |
| | | Foam stabilizer 1 | 1.5 | 2/2 | No coagulation for a longer term, high viscosity |
| | | Foam stabilizer 2 | 0.5 | 1/2 | |

The rheology modifier named RM-12W (Dow Chemicals) showed the best performance with no coagulation and a window to fine tune the viscosity of the foam for the optimum fluidity for application and against sagging. Recipe 10 was found to be the optimum formulation with the optimum viscosity and levelling properties. This formulation shows no coagulation or stability issues during both application and storage.

Example 2: Application Performance

Application of the NR foam 10 was done with a one-time use cartridge. A manual dispensing gun was used for dispensing the foam to stainless steel and PE plates.
The foam shows good levelling upon drying. The application was done with a nozzle having a circular cross-section of 50 mm$^2$ and at a pressure of ca. 2 bar, and the time used for drying/vulcanization was enough to get a good levelling of uneven foam surface (generally 3 hours at 80° C.). During the application of the foam, no sagging was observed on the surfaces with an inclination angle less than 90°. Cellular homogeneity of the foam is found to be dependent on the thickness of the applied layer, which is between 5 and 15 mm. As the thickness is increased (as of 10 mm), the bottom of the foam tends to collapse during the drying/curing process, which leads to a gradient change in density and cellular homogeneity of the foam in the vertical axis.

Example 3: Swelling Performance

Swelling behavior of the foam indicates its sealing performance after a puncture.
In these swelling tests foam samples with different vulcanization times and temperatures were tested. Swelling tests were done in two different ways. In the first test, the swelling ratio was calculated and in the second test the sealing effect is inspected.
Table 3 shows the details of the parameters of the swelling tests and Table 4 shows the results and observations of the swelling and sealing performances of samples. The swelling ratio is calculated with respect to the change in horizontal area of the discs (~diameter$^2$) (change in thickness was ignored).

TABLE 3

Parameters of the swelling tests

| Parameters | Swelling ratio test | Sealing test |
|---|---|---|
| Sample shape and dimensions | Disc (diameter 28 mm) | Disc (diameter 34 mm) with a hole (diameter 8 mm) |
| Swelling procedure | The sample is dipped in the fuel | The fuel is poured through the hole |
| Testing time (min) | 6 | 1 |
| Amount of fuel used (ml) | 200 | 10 |
| Evaluation | The swelling ratio (%) is measured | The sealing of the hole is inspected |

TABLE 4

Results of the swelling tests

| Samples | Vulcanization t and T | Swelling ratio (%) Benzine | Diesel | Sealing (yes/no) Benzine | Diesel |
|---|---|---|---|---|---|
| Recipe 10-60 | 60° C./15 h | 136 | 82 | yes | yes |
| Recipe 10-80 | 80° C./3 h | 156 | 104 | yes | yes |
| Recipe 10 | 100° C./2 h | 120 | n.a. | yes | no |
| Reference SSF foam | n.a. | 118 | 18 | yes | no |

In general, the sample foams showed better performance than the reference SSF foam. The percentage swelling was around 100% even with diesel, where reference SSF foam showed only 18% swelling.

Example 4: Mechanical Properties

Mechanical properties of two foam samples were measured, and the results are summarized in Table 5. The two samples were prepared with the same recipe showing best performance in application and swelling but vulcanized in two different conditions (recipe 10-60 and recipe 10-80 in Table 4).

TABLE 5

Mechanical properties

| Property | Test conditions | Recipe 10-80 | Recipe 10-60 | SSF |
|---|---|---|---|---|
| Tensile strength (TS) (MPa) | 300 mm/min at 23° C. | 1.2 | 1.2 | 2.1 |
| Elongation at break (E@b) (%) | 300 mm/min at 23° C. | 511 | 496 | 495 |
| Change in TS (MPa) after ageing | 7 days at 70° C | −0.4 (0.8 MPa) | −0.3 (0.9 MPa) | 0 (2.1 MPa) |
| Change in E@b (%) after ageing | 7 days at 70° C | −29 (361%) | −29 (352%) | −2.2 (484%) |
| Compression set (CS) (%) | 72 h at 23° C. | 12.3 | 8.3 | 2.6 |
| Compression Set (CS) (%) | 24 h at 70° C. | 60.5 | 31.8 | 21.4 |

Example 5: Shooting Tests

Table 6 shows a summary of composition of the shooting samples and the results of the shooting tests.
As self-sealing foam the formulation of Recipe 10 was used at different foaming speed: 8 Hz for 10/1, 4 Hz for 10/2 and 2 Hz for 10/3 as well as a reference SSF foam.
The observations in shooting tests showed that the primer layer has no contribution in sealing function.
Textile layers function as a skeleton of the cover and gives firmness to the coating system and consequently limits the volume increase of swollen foam. This limitation helps the foam to be swollen only locally in the shot area, therefore extreme swelling and its negative consequences are prevented. Kevlar has a better performance than Dyneema thanks to its relatively more adhesive surface.

TABLE 6 shooting tests

| Sample no | Pre-covers | | | SSF (open cell) | | | | Post-covers | | Vulcanization |
|---|---|---|---|---|---|---|---|---|---|---|
| | Primer | Textile | Armaflex | glue | 1st layer | 2nd layer | 3rd layer | glue | Textiel | PU | T/t |
| 3 | x | | | | 3 mm 10/2 | 3 mm 10/3 | — | x | Dyneema | x | 60° C./15 h |
| 4 | x | | | | 6 mm 10/1 | — | — | x | Dyneema | x | 60° C./15 h |
| 5 | x | | x | | 6 mm 10/1 | — | — | x | Dyneema | x | 60° C./15 h |
| 6 | x | | x | | 3 mm 10/2 | 3 mm 10/3 | — | x | Dyneema | x | 60° C./15 h |
| 19 | | x | x | | 3 mm Ref | 3 mm Ref | — | x | Dyneema | x | n.a. |
| 20 | | x | x | | 3 mm Ref | 3 mm Ref | — | x | Dyneema | x | n.a. |
| K1_0 | | | x | | 2 mm 10/3 | 2 mm 10/3 | 2 mm 10/3 | x | Kevlar | x | |

| | | Results | | | |
|---|---|---|---|---|---|
| Sample no | diesel filled (L) | leaking (0-10 min) | leaking (30-60 min) | leaking (>12 h) | diesel recovered |
| 3 | 19 | little leaking | on leaking, total 60 ml after 60 min | 350 mL after ca. 12 h | 17.5 L |
| 4 | 20 | good | total 50 mL after 30 min | 6-7 L after 20 h | |
| 5 | 19 | total 25 ml after 15 min | somewhat better than nr4 (no value) | 6-7 L after 20 h | |
| 6 | 19 | little/no leaking | little leaking, total 600 ml after 60 min | 12.2 L after ca. 12 h | 6.2 L |
| 19 | 19 | leaking | little leaking, total 360 mL after 60 min | 3.7 L after ca. 12 h | ~15 L |
| 20 | 19 | total 5 ml after 15 min | little leaking (no value) | total 4-5 L after 20 h | |
| K1_0 | 20 | little/no leaking | no leaking | no leaking (<5 mL) after 12 h | ~19.9 L |

The results presented in the above examples show that the present invention provides foam formulations with a density range 0.2-0.4 g/ml, good swelling properties that are comparable to reference SSF foam, showing some extent of adhesion to both PE and steel surfaces and having a potential to be applied in a dispensing manner on rotating bodies.

The invention claimed is:

1. A method of making a self-sealing fuel tank comprising providing the fuel tank with a fuel-activated self-sealing latex foam layer wherein the fuel-activated self-sealing latex foam layer comprises a non-ionic associative thickener as rheology modifier and optionally one or more of a foam stabilizer, emulsifier, coagulator or vulcanization component, wherein the fuel activated self-sealing latex foam layer is provided as a formulation to the fuel tank by pouring or spraying the formulation onto the fuel tank.

2. The method according to claim 1 wherein the rheology modifier has a polymeric backbone constructed from one or more blocks of polymerized oxyalkylene units with hydrophobic groups attached to or within the backbone.

3. The method according to claim 2 wherein the polyoxyalkylene units are linked with a multifunctional isocyanate.

4. The method according to claim 3 wherein the backbone contains amine functionality.

5. The method according to claim 1 wherein the rheology modifier is used in an amount of up to 15% by weight based on the total self-sealing latex foam.

6. A fuel container having walls defining a space in which fuel is to be contained, a layer of deformable material bonded to the external surfaces of the container walls, and a self-sealing layer of fuel-activated swellable material bonded to the deformable material, wherein said self-sealing layer is a latex foam layer comprising a non-ionic associative thickener as rheology modifier and optionally one or more of a foam stabilizer, emulsifier, coagulator or vulcanization component.

7. The fuel container according to claim 6 wherein the thickness of the self-sealing layer is between 3 and 15 mm.

8. The fuel container according to claim 6 wherein the deformable material is a rubber or rubber-like material of the closed celled type.

9. The fuel container according to claim 6 comprising a fabric layer on top of the self-sealing layer.

10. The fuel container according to claim 9 comprising a polyurethane layer on top of the fabric layer.

11. The method of claim 1 wherein the applied fuel activated self-sealing latex foam layer formulation is cross-linked to form a stable cell structure.

12. The method of claim 1 wherein the latex foam layer is a natural rubber (NR) latex foam layer.

* * * * *